United States Patent [19]

Marcotte

[11] 4,153,070
[45] May 8, 1979

[54] PIPELINE DRIVE SYSTEM

[75] Inventor: Dennis Marcotte, Eugene, Oreg.

[73] Assignee: Western Irrigation and Manufacturing, Inc., Eugene, Oreg.

[21] Appl. No.: 680,976

[22] Filed: Apr. 28, 1976

[51] Int. Cl.² ............................................. B05B 3/18
[52] U.S. Cl. ..................................... 137/344; 239/212
[58] Field of Search ................. 137/344; 239/212, 213

[56] References Cited

U.S. PATENT DOCUMENTS

| 3,800,820 | 4/1974 | Trunnell | 239/212 X |
| 3,978,882 | 9/1976 | Cornelius | 239/212 X |

Primary Examiner—Gerald A. Michalsky
Attorney, Agent, or Firm—Kolisch, Hartwell, Dickinson & Stuart

[57] ABSTRACT

An elongate irrigation pipe is rotatably supported on a wheeled support member. A first gear is secured against rotation on the support member with the pipe extending rotatably therethrough. A rotator arm is secured to and extends radially outwardly from the pipe and has an orbital, fluid actuated motor mounted thereon. A second gear on the drive shaft of the orbital motor engages the teeth on the first gear, whereby actuation of the motor causes the rotator arm to rotate about the first gear and thus rotate the pipe. An operative connection between the pipe and wheel supports produces movement of the pipe over a field. Fluid pressure supply lines extend along the pipe to supply the orbital motor. Branch lines extend inwardly into the pipe, progress longitudinally through the pipe past the first gear and support member, and then exit from the pipe on the opposite side to continue along the length of the pipe to a second motor spaced longitudinally along the pipe line therefrom.

19 Claims, 4 Drawing Figures

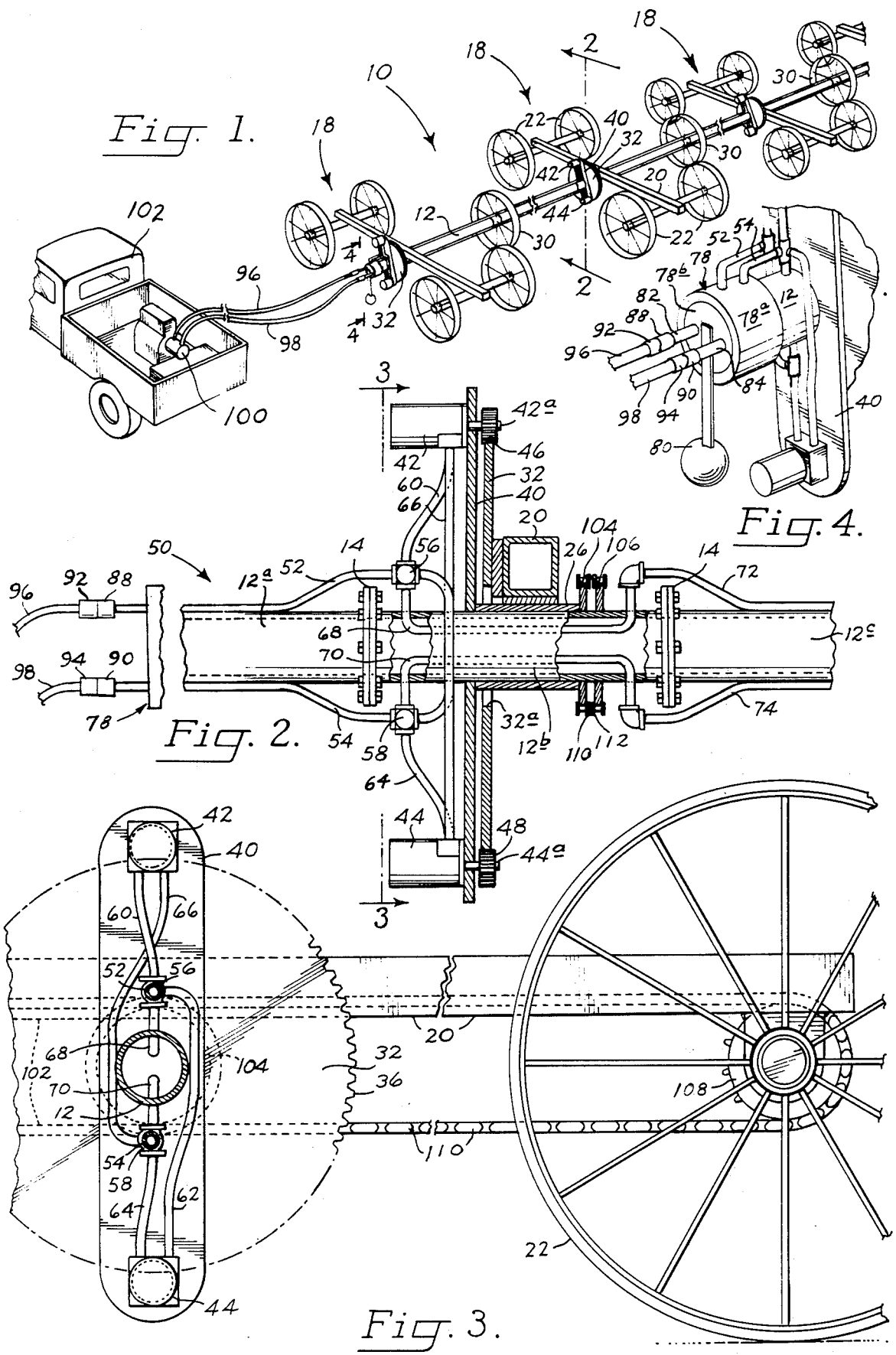

PIPELINE DRIVE SYSTEM

BACKGROUND AND SUMMARY OF THE INVENTION

This invention relates to a drive system for an elongate irrigation pipeline.

A variety of devices have previously been designed for moving long sections of irrigation pipelines over the ground. In the past some such systems included multiple wheel support devices connected to the irrigation pipeline at spaced intervals there-along, with each wheel support having its own independently operated drive motor. This has been costly and cumbersome in that an operator was required to traverse the length of the pipeline to physically start and control the independent motor drive units. Another form of prior device includes a single motor which rotates the pipeline, with the pipeline itself serving to provide rotative force to the wheel supporting it. Since such pipelines are very long and somewhat flexible this often results in inconsistent rotation of the pipeline so that variations in positioning of sprinklerheads on the pipeline and variations in positioning of sections of the line occur.

A third style of prior drive system is exemplified by the device illustrated in the Jensen U.S. Pat. No. 2,946,515 in which power is transmitted from a drive motor through an elongate drive shaft extending the entire length of the string of pipe. Not only does this result in the need for complex mechanical systems to transmit power from the drive shaft which is rotating both about its own axis and also rotating about the axis of the pipeline, but since the drive shaft itself has a tendency to wrap, or twist, along its length due to torsional forces, it will also result in inconsistencies of the drive for the line along the length of the line.

A general object of the present invention is to provide a novel drive system for an irrigation pipeline which eliminates the previously discussed advantages of prior systems.

Another object of the invention is to provide such novel drive system which is simply an economically constructed, and due to the simplicity of construction may provide long term operation with minimum maintenance requirements.

More specifically, an object of the invention is to provide a novel drive system for an irrigation pipeline wherein each wheel support may have its own fluid actuated drive system and wherein the fluid pressure for actuating such drive system may be provided from a single source, preferably from one end of the pipeline.

Yet another object of the present invention is to provide such novel apparatus in which fluid pressure supply and exhaust lines for supplying and exhausting fluid from pressure actuated motors in the various drive systems spaced longitudinally along the pipeline may be routed past stationery elements in the system and still be permitted rotation with the pipeline along the length thereof.

DRAWINGS

These and other objects and advantages will become more fully apparent as the following description is read in conjunction with the drawings wherein:

FIG. 1 is a simplified perspective view of an irrigation pipeline having a drive system constructed according to an embodiment of the invention, with such drive system being illustrated operatively connected to a motor-operated fluid pressure supply pump carried in the bed of a truck at one end of the pipeline;

FIG. 2 is an enlarged cross-sectional view of a portion of drive mechanism in the system;

FIG. 3 is a view taken generally along the line 3—3 in FIG. 2, with portions broken away; and FIG. 4 is an enlarged perspective view taken along line 4—4 in FIG. 1.

DETAILED DESCRIPTION OF A PREFERRED EMBODIMENT OF THE INVENTION

Referring to the drawings, and first more specifically to FIG. 1, at 10 is indicated generally an elongate irrigation pipeline system such as may be used to provide irrigation sprinkling to large agricultural fields. The system includes an elongate pipe 12 which may comprise a plurality of elongate sections, such as those indicated in FIG. 2 at 12a, 12b, 12c, sealingly interconnected at adjacent sets of their ends by flanges 14. Although it is not illustrated in detail herein, it should be understood that such pipelines have sprinklerheads mounted thereon which communicate with the interior of the pipe and upon supply of water under pressure to the interior of the pipe, water is sprayed outwardly through the sprinklerheads onto the fields.

Pipeline 12 is supported at spaced intervals by wheeled support devices, or frames, indicated generally at 18. Each wheel support device includes an elongate, substantially horizontal support beam, or member, 20 at the opposite ends of which are journaled support wheels 22. Referring particularly to FIG. 2, it will be seen that a cylindrical, or tubular, journal support 26 is secured, as by welding, to the underside of a mid-region of support beam 20. A portion of pipe 10 extends rotatably through journal support 26 and is supported above the ground for rotation therein.

A plurality of wheels 30 are mounted on pipeline 12 intermediate support devices 18 to provide support for the pipeline intermediate the support devices. Wheels 30 are secured to the pipeline for rotation therewith. In the embodiment illustrated wheels 22, 30 all have the same diameter. The purpose for this will be described below.

A large bull, or ring, gear 32 is secured in a substantially upright position to one side of beam 20. The bull gear is mounted concentric with journal 26 and pipeline 12, and has a bore 32a extending therethrough through which the pipeline extends. The bull gear has gear teeth 36 disposed circumferentially about its perimeter. In FIG. 3 only a portion of the gear teeth have been illustrated for the sake of simplicity in the drawings, but it should be understood that such gear teeth extend fully about the periphery of gear 32.

An elongate rotator arm 40 is secured to pipe 12 and extends radially outward therefrom, to opposite sides of the pipe. Rotator arm 40 thus is mounted for rotation with pipeline 12. It should be recognized that bull gear 32 occupies a plane substantially perpendicular to pipeline 12 and rotator arm 40 is rotatable with the pipeline in a plane adjacent and substantially parallel to gear 32.

Mounted adjacent opposite ends of rotator arm 40 are fluid pressure actuated orbital motors 42, 44. Drive shafts 42a and 44a of the motors extend toward bull gear 32 substantially parallel to a longitudinal axis of pipeline 12 and have pinion, or spur, gears 46, 48 secured thereto, respectively. Gears 46, 48 are mounted to engage teeth 36 on gear 32. Actuation of motors 42, 44 to rotate gears 46, 48 produces rotation of the rotator arm and pipeline about the longitudinal axis of the pipeline.

Pressure fluid for operating motors 42, 44 at each of wheel support devices 18 is provided by fluid pressure line means indicated generally at 50. The line means includes a first line 52 and a second line 54 extending along and secured to pipeline 12 for rotation therewith. One set of ends of lines 52, 54 are connected to branching couplings, or means, 56, 58, respectively. A pair of lines 60, 62 operatively connect branch coupling 56 and line 52 to one set of sides of motors 42, 44 and a second pair of lines 64, 66 operatively connect branch coupling 58 and line 54 to the opposite sets of sides of motors 42, 44. Another pair of lines 68, 70, also operatively connected at one set of their ends to branch couplings 56, 58, respectively, extend inwardly through appropriate sealing devices to the interior of pipeline section 12b, extend through the interior of the pipe section past bull gear 32 and support beam 20, and then exit from the pipeline through appropriate sealing devices to prevent leakage of fluid from the interior of the pipe. Other line sections 72, 74 then connect to the opposite ends of lines 68, 70 to extend further down the pipeline to the next set of motors at the next adjacent wheel support device 18.

As is best seen in FIGS. 1 and 4, at one end of the pipeline the fluid pressure lines are connected to a rotatable coupling 78 mounted on the end of pipeline 12 nearest the viewer. The rotatable coupling includes an outer section 78a which is secured to and rotatable with pipeline 12. An inner section 78b is rotatale within section 78a and has a hanging weight 80 secured thereto for restraining it from rotation with the pipeline and section 78a. Lines 52, 54 connect to ports in section 78a and a pair of outlet hoses 82, 84 connect to ports in the face of coupling section 78b. Rotatable coupling 78 has a plurality of annular passages therein to provide fluid communication between hoses 52, 82 and between hoses 54, 84, respectively throughout relative rotation between the coupling sections during rotation with the pipeline.

A pair of quick disconnect and closing couplings 88, 90 are connected to outer ends of hoses 82, 84, respectively. These couplings are of a conventional type which automatically close to retain fluid in the lines upon disconnection, and upon connection allow pressure fluid passage therethrough. Couplings 88, 90 are illustrated connected to quick-connect couplings 92, 94 on adjacent ends of pressure fluid supply lines 96, 98. As is best seen in FIG. 1, the opposite set of ends of lines 96, 98 are operatively connected to inlet and outlet ports on a motor driven fluid pressure pump 100 carried in the back of a truck 102 adjacent one end of the pipeline.

Referring again to FIGS. 2 and 3, a pair of adjacent sprockets 104, 106 are secured to pipe section 12b for rotation therewith. Similar sprockets, such as that indicated at 108 in FIG. 3 are secured to the axles for wheels 22 on the pipe support devices 18. A first elongate, endless drive chain 110 is trained about sprocket 104 on the pipeline and extends outwardly therefrom to be trained about sprocket 108 at the right hand side of FIG. 3 to drive the wheels nearest the viewer in FIG. 1. A second drive chain 112 is trained about sprocket 106 and extends outwardly in the opposite direction from chain 110 to be trained about a similar sprocket associated with the axle for the wheels at the opposite end of the support beam. Thus, when pipeline 12 is rotated chains 110, 112 transmit this rotational force to wheels 22 on the support devices.

Explaining operation of the device, when it is desired to move the pipeline laterally over a field, it is a simple matter to connect lines 96, 98 from pump 100 to the pressure feed line through the quick connect and disconnect couplings 88, 90, 92, 94. It should be understood that the fluid pressure lines on the pipeline generally are maintained filled with a working fluid when not in operation. Upon operation of motor-driven pump 100, which draws some working fluid from an auxiliary fluid reservoir, fluid under pressure is supplied to and exhausted from motors 42, 44 on each of the wheel support devices 18. The pressure fluid is supplied to motors 42, 44 in such a manner that they are caused to rotate in a common direction with pinion gears 46, 48 thereon rotating arms 40 and pipeline 12 in a common direction about gears 32. As the pipeline turns, wheels 30 secured thereto and wheels 22 on the support beams are caused to rotate at a common speed. Since all wheels 22, 30 are the same diameter and rotate at the same speed this causes the entire pipeline to move as an entity laterally across the field as desired. With portions of the fluid supply and exhaust lines extending inwardly through sections of the pipeline to pass the bull gears and support beams, a continuous pressure fluid line may be provided to supply pressure fluid to all of the orbital motors along the pipeline throughout operation of the system.

With such apparatus an operator at one end only of the long pipeline may cause it to be moved laterally over the field. Further, since a common source of pressure fluid is utilized to actuate all of the orbital motors throughout the full length of the pipeline, there should be substantial consistency of movement for every section of the pipeline as it is caused to move over the field. Rotatable coupling 78 permits such movement without tangling of hoses 96, 98.

Although it is not illustrated here, a second series of fluid pressure supply and exhaust lines may be provided extending from the one end of the pipeline to different orbital motors in the device. By the use of said second series of pressure fluid supply and exhaust lines, a controlled differential in movement between different sections of the line could br produced if desired. Explaining further, selective control of the flow of pressure fluid to such multiple sets of lines would control the orbital motors for different sections of the line if it were desired to produce differential movement between spaced sections of the lines. It should be understood that this also can be accomplished from a single end of the line also. p While a preferred embodiment of the invention has been described herein, it should be apparent to those skilled in the art that variations and modifications are possible without departing from the spirit of the invention.

It is claimed and desired to secure by letters patent:

1. Apparatus for moving an elongate pipe over the ground laterally of its longitudinal axis comprising wheel support means supporting said pipe above the ground with the pipe mounted for rotation about its longitudinal axis and operatively connected to said wheel support means for driving said wheel support means on rotation of the pipe to move said pipe over the ground, a first gear mounted concentric with said pipe and having an opening formed therein through which said pipe extends, means connected to said gear inhibiting rotation thereof during movement of the pipe, rotator arm means secured to said pipe and extending radially outwardly therefrom adjacent said gear, fluid actuated motor means mounted on said rotator arm and having a second gear operatively connected thereto engaging said first gear, said second gear upon powered rotation by said motor urging said rotator arm to rotate about said first gear to rotate said pipe and drive said wheel support means, and fluid pressure line means extending along said pipe and connected to such motor through which pressure fluid may be supplied to actuate said motor.

2. The apparatus of claim 1, wherein said line means is connected to said pipe for rotation therewith about the longitudinal axis of said pipe.

3. The apparatus for claim 2, which further comprises second motor means spaced longitudinally of said pipe from said first motor, and said line means includes a line portion extending into said pipe on one side of said first gear, progressing longitudinally through said pipe past said gear, and extending from said pipe at the opposite side of said first gear.

4. The apparatus for claim 3, wherein said line means further comprises line branching means permitting routing of a portion of pressure fluid supplied to said line means to said first mentioned motor means at one point along the length of the pipe and routing of remainder portions of said fluid to said second motor means spaced therefrom.

5. The apparatus of claim 1, wherein said fluid pressure line means further comprises coupling means for operatively connecting said line means to a source of pressure fluid.

6. The apparatus of claim 1, wherein said wheel support means comprises an elongate support member, wheels rotatably mounted on said support member, and journal means rotatably supporting said pipe on said support member, and said first gear is secured to said support member.

7. The apparatus of claim 6, wherein said first gear occupies a first plane extending substantially normal to the longitudinal axis of said pipe, said rotator arm is mounted for rotation in a plane adjacent and substantially paralleling said first plane, and said motor means comprises an orbital motor secured to said rotator arm adjacent circumferentially disposed gear teeth on said first gear, with a drive shaft of said motor substantially parallel to the longitudinal axis of the pipe and said second gear being secured to said drive shaft for engagement with said teeth of the first gear.

8. The apparatus of claim 1, wherein said line means comprises first and second lines extending along said pipe and operatively connected to said motor means for supplying and exhausting pressure fluid to and from said motor means.

9. Apparatus for rotating a wheel-supported irrigation line about its longitudinal axis for travel thereof over a field comprising:
a frame to which the irrigation line is rotatably mounted;
means for supporting the frame;
ring gear means fixed relative to the frame;
arm means fixed relative to the irrigation line and rotatable therewith;
gear means rotatably mounted relative to the arm means and operatively coupled with the ring gear means; and means for driving the gear means rotatably mounted relative to the arm means so that said driven gear means move about the ring gear means to rotate the arm means and irrigation line.

10. The apparatus of claim 9, wherein the means for driving the driven gear means comprise fluid motor means mounted to the arm means and drivingly connected with the driven gear means, and means for driving said fluid motor means comprising conduit means running along the irrigation line and communicating with the fluid motor means.

11. The apparatus of claim 10, wherein said arm means comprise first and second oppositely extending arms, and wherein the driven gear means comprise first and second driven gears in engagement with the ring gear means on opposite sides thereof along a diameter of the ring gear means.

12. The apparatus of claim 11, wherein the means for driving the driven gear means comprise a first fluid motor mounted to the first arm and drivingly connected with the first driven gear, and a second fluid motor mounted to the second arm and drivingly connected with the second driven gear.

13. The apparatus of claim 12, wherein the means for supporting the frame comprise frame wheel means rotatably mounted relative to the frame, and further comprising means interconnecting the irrigation line and frame wheel means for providing that rotation of the irrigation line drivingly rotates the frame wheel means.

14. The apparatus of claim 13, wherein the means interconnecting the irrigation line and frame wheel means comprise chain and sprocket means.

15. The apparatus of claim 10, wherein the means for supporting the frame comprise frame wheel means rotatably mounted relative to the frame, and further comprising means interconnecting the irrigation line and frame wheel means for providing that rotation of the irrigation line drivingly rotates the frame wheel means.

16. The apparatus of claim 15, wherein the means interconnecting the irrigation line and frame wheel means comprise chain and sprocket means.

17. Apparatus for rotating a wheel-supported irrigation line about its longitudinal axis for travel thereof over a field comprising:
a frame to which the irrigation line is rotatably mounted;
frame wheel means rotatably mounted relative to the frame for supporting the frame;
a ring gear fixed relative to the frame;
arm means fixed relative to the irrigation line and rotatable therewith, and comprising first and second arms extending in opposite directions from said irrigation line;
gear means rotatably mounted relative to the arm means, and comprising a first gear rotatably mounted to the first arm adjacent the extending end thereof, and a second gear rotatably mounted to the second arm adjacent the extending end thereof, the first and second gears being in engagement with the ring gear on opposite sides thereof along a diameter of the ring gear; and
means for driving the first and second gears so that the first and second gears move on and about the ring gear to rotate the first and second arms and irrigation line.

18. The apparatus of claim 17, wherein the means for driving the first and second gears comprise first and second hydraulic motors mounted to the extending ends of first and second arms respectively and drivingly connected with the first and second gears respectively, and means for driving the first and second hydraulic motors, comprising conduit means running along and secured relative to the irrigation line to rotate therewith, and communicating with the first and second hydraulic motors.

19. The apparatus of claim 18, and further comprising means interconnecting the irrigation line and frame wheel means comprising chain and sprocket means for providing that rotation of the irrigation line drivingly rotates the frame wheel means.

* * * * *

UNITED STATES PATENT AND TRADEMARK OFFICE
CERTIFICATE OF CORRECTION

PATENT NO. : 4,153,070
DATED : May 8, 1979
INVENTOR(S) : Dennis Marcotte

It is certified that error appears in the above—identified patent and that said Letters Patent are hereby corrected as shown below:

In the claims:

Claim 3, line 21, delete "extending" and insert --exiting--.

Claim 13, line 24, delete "12" and insert --10--.

Claim 15, line 33, delete "10" and insert --12--.

Signed and Sealed this

Twenty-second Day of July 1980

[SEAL]

Attest:

SIDNEY A. DIAMOND

Attesting Officer        Commissioner of Patents and Trademarks